Jan. 15, 1929.  
C. W. BOARD ET AL  
AGRICULTURAL IMPLEMENT  
Filed Jan. 19, 1928  
1,699,178
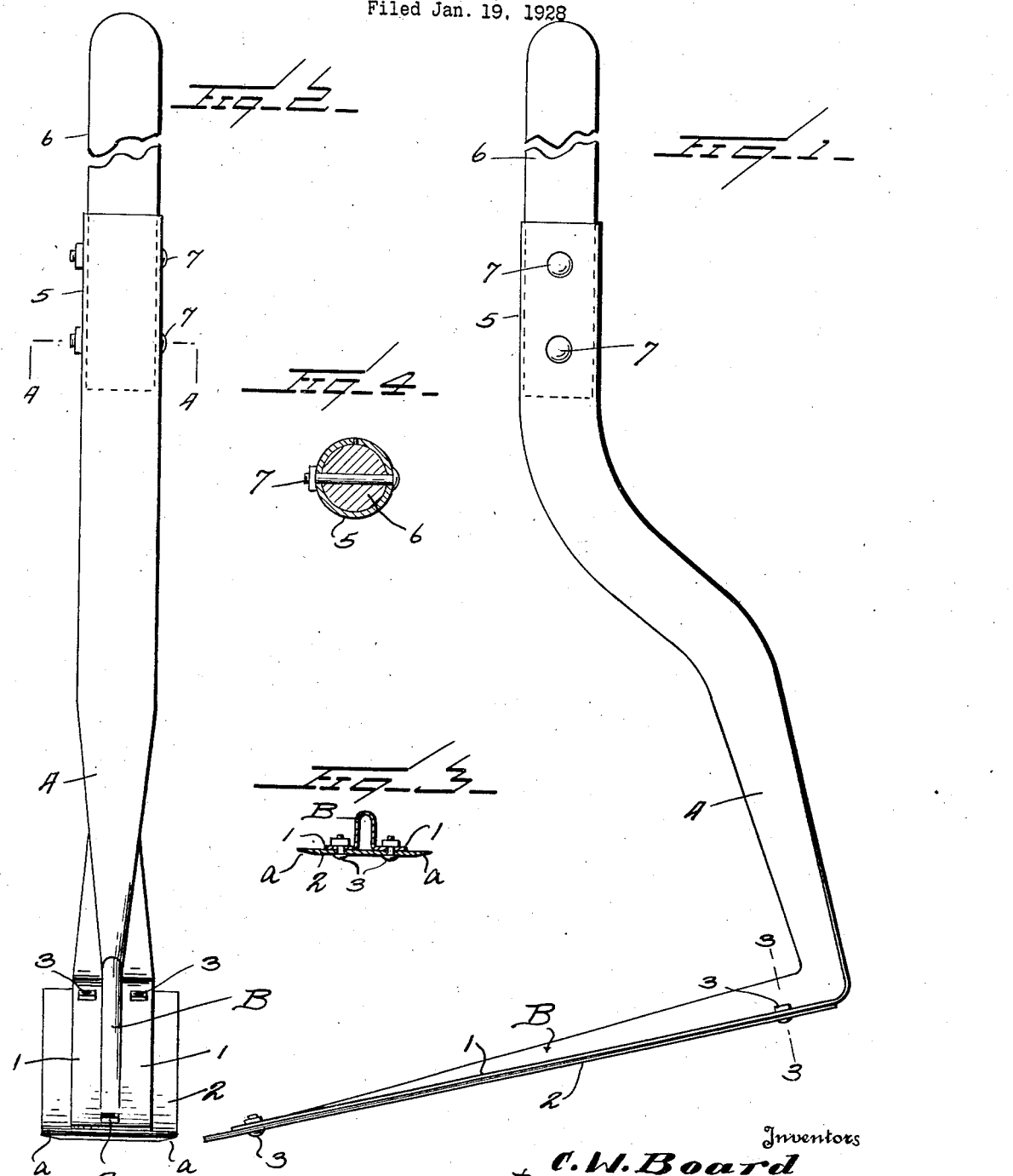
Inventors  
*C. W. Board*  
*W. E. Crosby*  
By *Watson E. Coleman*  
Attorney Patented Jan. 15, 1929.

1,699,178

UNITED STATES PATENT OFFICE.

CHARLES W. BOARD AND WALTER E. CROSBY, OF DE LAND, FLORIDA.

AGRICULTURAL IMPLEMENT.

Application filed January 19, 1928. Serial No. 247,950.

This invention relates to an agricultural implement and it is an object of the invention to provide a device of this kind which can be effectively employed for cutting weeds, grass, stubble, etc.

It is also an object of the invention to provide a device of this kind comprising a handle and a working blade or bit together with means for connecting the one to the other in a manner to prevent turning in the hands of the operator or collapsing upon abnormal impact.

An additional object of the invention is to provide a device of this kind provided with a blade or bit having the edges thereof sharpened whereby the blade is capable of effective cutting action upon either a forward or reverse move or stroke.

A still further object of the invention is to provide an implement of this kind wherein the blade or bit is disposed on a slant with respect to the handle sufficient to move said blade or bit substantially level with the ground when the handle is held at an angle with the body forming a natural position for operation, the blade or bit making a scythe-like cut when the movement of the implement is similar to the swing of an axe.

The invention consists in the details of construction and in the combination and arrangement of the several parts of our improved agricultural implement whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in side elevation of an implement constructed in accordance with an embodiment of our invention;

Figure 2 is a view in front elevaton of the device as illustrated in Figure 1;

Figure 3 is a sectional view taken substantially on the line 3—3 of Figure 1;

Figure 4 is a sectional view taken substantially on the line 4—4 of Figure 2.

As disclosed in the accompanying drawing, B denotes a bracket or foot, preferably metal, of a channel construction in cross section and having its free longitudinal marginal portions defined by the outstanding flanges 1 whereby said bracket or foot may have effectively secured thereto the blade or bit 2, the connection or securement of the blade or bit 2, as herein disclosed, is accomplished through the bolts 3 or their equivalent.

The bracket or foot B is relatively long and is perpendicularly related to the outer end portion of the shank 4 with which the bracket or foot B is, as herein disclosed, integrally formed. This shank 4 is substantially sigmoidal in form and has its outer end portion, or that end portion remote from the bracket or foot B, tubular to provide a socket 5 to receive the inner end portion of an elongated handle member 6, preferably of wood. The handle member 6 is held to the shank 4 by the bolts 7 or the equivalent thereof.

It is to be noted that the curvature of the shank 4 is in a direction coplanar with the foot or bracket B and is so disposed as to have the end portion of the shank immediately adjacent to the foot or bracket B offset with respect to the socket 5 or the handle member 6 engaged therewith. This arrangement of the shank also provides that the foot or bracket B extend beyond opposite sides of the handle member 6. The foot or bracket B is disposed on a downward or outward incline with respect to the handle member 6 so that in practice the blade 2 engaged with said foot or bracket B will come into contact in substantially a level position with respect to the ground when the movement of the implement is similar to the swing of an axe.

The blade 2 is preferably rectangular in form and has its longitudinal marginal portions formed into the knife edges $a$, said blade being of a length to extend from the junction of the bracket or foot B with the shank 4 to a point beyond the outer end of said bracket or foot and of a width to extend beyond opposite sides thereof.

The construction of our improved implement, as hereinbefore described, is such as to assure lightness, strength and rigidity together with an arrangement of the parts whereby the implement is held in natural position when the operator is standing. The weight and hang of the implement is also such to prevent twisting or turning in the hand and the particular formation of the shank 4 permits the blade 2 to readily reach under fences, shrubbery, etc., to cut undergrowing vegetation.

The construction of the shank, as herein disclosed, and the arrangement of the blade 2 with respect thereto also eliminates clogging and provides an implement which can cut vegetation of varying heights.

It is also believed to be obvious that the construction of the implement is such that any part thereof may be readily replaced and that by providing a blade 2 with two cutting edges a considerable saving in time is made together with a conservation of energy, especially in view of the fact that the implement is effective upon swing or movement of the implement in both or either directions.

From the foregoing description it is thought to be obvious that an agricultural implement constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

An implement of the class described comprising a substantially sigmoidal shank, a handle member engaged with one end portion of the shank, a bracket extending from and substantially at right angles to the opposite end portion of the shank, and a flat blade secured to said bracket and extending entirely therealong and beyond opposite sides thereof, the marginal portions of the blade being formed into cutting edges, said bracket being of channel construction and having its longitudinal marginal portions defined by outstanding flanges, the blade being secured directly to said flanges.

In testimony whereof we hereunto affix our signatures.

CHARLES W. BOARD.
WALTER E. CROSBY.